United States Patent [19]

Mistry

[11] 4,348,691

[45] Sep. 7, 1982

[54] MASTER ANTENNA SUBSCRIPTION TELEVISION SYSTEM AND THE LIKE

[75] Inventor: Kantilal Mistry, Freehold, N.J.

[73] Assignee: Blonder-Tongue Laboratories, Inc., Old Bridge, N.J.

[21] Appl. No.: 205,528

[22] Filed: Nov. 10, 1980

[51] Int. Cl.³ ............................................. H04N 7/16
[52] U.S. Cl. ..................................... 358/114; 358/86; 358/120; 455/3
[58] Field of Search ......................... 358/86, 114, 120; 455/3, 6, 7, 14, 20

[56] References Cited

U.S. PATENT DOCUMENTS

| | | | |
|---|---|---|---|
| 2,633,492 | 3/1953 | Ring | 455/20 |
| 3,813,482 | 5/1974 | Blonder | 358/120 |
| 4,074,310 | 2/1978 | Hurney et al. | 358/86 |
| 4,095,258 | 6/1978 | Sperber | 358/120 |
| 4,145,717 | 3/1979 | Gulf et al. | 358/120 |
| 4,163,252 | 7/1979 | Mistry et al. | 358/120 |

*Primary Examiner*—S. C. Buczinski
*Attorney, Agent, or Firm*—Rines and Rines, Shapiro and Shapiro

[57] ABSTRACT

This disclosure is concerned with simplification of customer TV decoders for scrambled television signals fed from a master antenna system or the like, by novel head-end decoding and simultaneous scrambled STV transmission along the distribution cable to the user TV sets.

3 Claims, 1 Drawing Figure

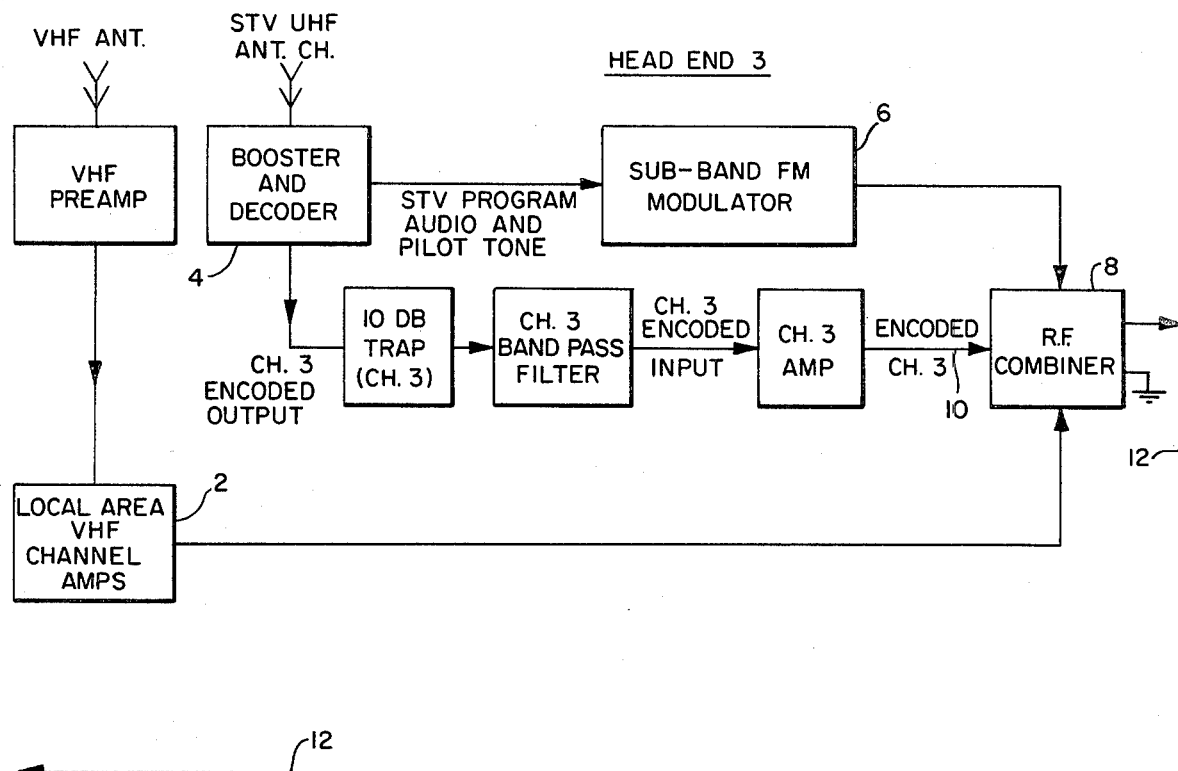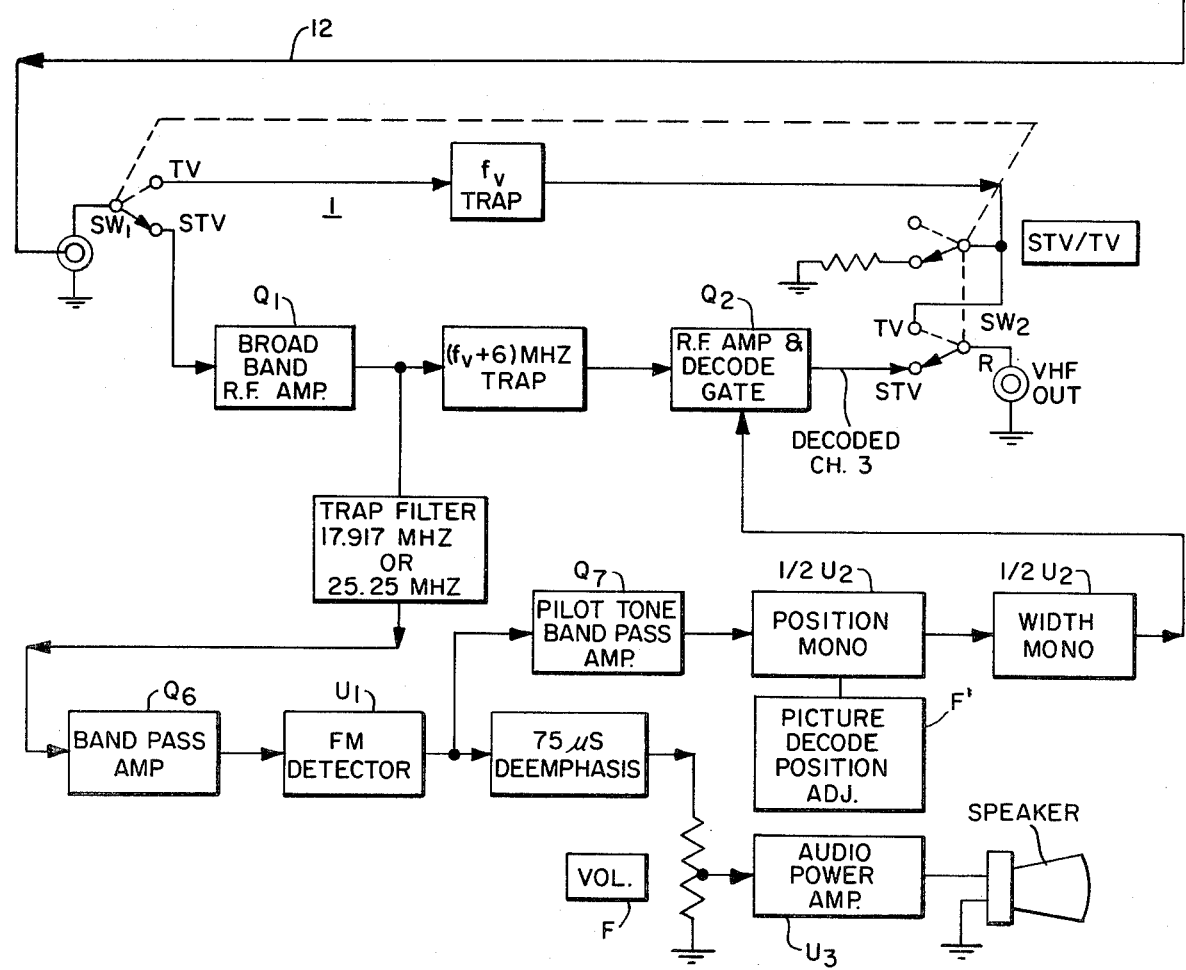

MASTER ANTENNA SUBSCRIPTION TELEVISION SYSTEM AND THE LIKE

The present invention relates to master antenna subscription television systems (MSTV) and the like, being more particularly directed to master antenna or similar signal distribution installations for receiving scrambled or similar encoded television signals and the like and distributing the same, as along a cable, to a plurality of customer television set locations, as in apartment houses, motels, hotels or the like, where separate decoders are provided for decoding or unscrambling the signal.

Highly successful systems and techniques for television signal encoding or scrambling and decoding or unscrambling are described in prior United States Letters Pat. Nos. 3,813,482; 4,095,258; and 4,163,252 of Blonder Tongue Laboratories, Inc., the assignee of the present invention. It has now been found that where such subscription television (STV) transmissions are to be received at a common location where the signal is to be distributed to a plurality of user television locations, hereinafter described in connection with the illustrative application to master antenna systems and the like, the decoding apparatus for each television set user may be radically simplified and rendered of relatively low cost. This is as distinguished from proposals to take a segment of the television picture signal including the sync, and amplitude modulaing the same upon a carrier in the FM band which is to be separately transmitted and then added back to the scrambled picture as in, for example, the Magnavox Model X-MU descrambler for cable television. This trailing off of the low end of the spectrum and adding back in the receiver, however, requires about half the FM bandwidth—almost the equivalent of a full channel—to propagate the same over the cable, and the restoration is never perfect in view of the altered picture.

In accordance with the present invention, on the other hand, in a master antenna subscription television (MSTV) system, the function of amplifying and conditioning the standard VHF television channels (FM band, if required) and UHF STV transmissions from a central location is performed while retaining the video and audio security features of the STV scrambled video and sound at the customer TV locations, without video-alteration or restoration, as described in said Letters Patent, and at the lowest possible system cost. It is therefore an object of the present invention to provide a new and improved STV distribution and decoding system particularly adapted for MSTV applications and the like and in which the total compatibility of the STV system of the invention with that of said Letters Patent is also preserved. This is attained by not changing the characteristics of the received STV transmission at the head end of the antenna system, such that the encoded signal (for example, channel 3 or channel 2) distributed in the system is fully compatible with the types of decoders described in said Letters Patent and similar decoding apparatus.

A further object is to provide a novel, low-cost MSTV system of more general utility as well.

Other and further objects will be explained hereinafter and are more particularly delineated in the appended claims.

In summary, from one of its objectives, the invention embraces in a master antenna system and the like for receiving scrambled video signal sync subscription television signals and the like, having STV pilot tone and program audio signals, the combination of head end means for receiving UHF STV signals and provided with means for converting the same to a VHF channel while leaving the video signal sync in its scrambled state and extracting the STV pilot tone and program audio signals; FM modulator means at said head-end means connected to modulate a separate carrier with the extracted signals; means for sending the scrambled STV signals and the FM modulated separate carrier from the head end means along cable means to a plurality of separate television receivers; and each television receiver being provided with simplified decoder means comprising pilot-tone controlled R.F. decoding gate means to restore the scrambled sync to produce an unscrambled video signal, and FM detector means for demodulating said pilot tone to enable such control of the gate means and demodulating said program audio signals.

The system of the invention is comprised of an MSTV head end at a common signal distribution point and an MSTV decoder at each customer TV location in the apartment house, motel, hotel or other installation. This STV system, moreover, can also readily be used as a cable (CATV) pay TV system with suitable modification in the STV head end. Among the cost advantages attained by the invention in enabling the radical simplification of the MSTV decoder at the TV sets over the standard STV decoders, as described in said Letters Patent, are the elimination of the channel converter (such as the channel 68 to channel 3 converter), the single sideband program demodulator, the customary high pass filter/band pass filter amplifiers, the 23.6 kHz control tone detector, and the usual 4.5 MHz intercarrier detector or aural mixer. All these functions are now performed at the head end and do not require duplication in each customer's decoder, resulting in the novel low cost user decoder arrangement of the invention. The MSTV receiving system achieves its cost objective by processing as much of the received TV signal as possible at the head end, single control center. The head end receives the broadcast signals from the antenna system, amplifies and processes them, and then distributes them to the individual receivers of the system.

The invention will now be described with reference to the accompanying drawings, the single FIGURE of which constitutes a combined schematic circuit and block diagram illustrating the invention in preferred form.

Referring to the same, at the head end 3, the standard VHF channels are amplified as at 2. FM band signals may also be applied. The master antenna feeds a decoder 4 of the type described in said Letters Patent which converts the UHF STV to, say, Channel 3 encoded output at 10, but leaves the video signal horizontal sync in its scrambled state. This decoder 4 also extracts the STV pilot tone and program audio, and these signals drive an FM modulator 6 in the sub-band region, to FM-modulate a separate carrier at, for example, either 17.917 MHz or 25.25 MHz. All the above signals are then combined in an RF circuit 8 and distributed to the individual customers' simplified decoders and TV receivers, one of which is shown below the head end 3.

The combined standard TV, STV channel, and sub-band aural carrier from the MATV distribution system at 8 are fed at 12 to the MSTV decoder, labelled 1, having a two-position function switch SW1, labeled "TV" and "STV". This directly feeds the incoming signals through the $f_v$ trap to the TV receiver to provide normal operation for standard TV video and sound transmission. In the "STV" position, however, the input 12 feeds a broadband RF preamplifier Q1. The output of Q1 is applied through a 17.917 or 25.25 MHz trap filter, so-labelled, to a bandpass amplifier Q6 which is the FM-RF aural signal amplifier operating at a carrier frequency of 17.917 (25.25) MHz. The amplifier Q6 drives U1, the high-frequency FM detector. The detector U1 in turn demodulates both the pilot tone at 15.734 kHz, and the audio portion of the TV program. The audio is fed through a 75 μsec. de-emphasis circuit to the front panel (F) potentiometer volume control "VOL." which sets the input level to the audio power amplifier U3, and therefore the drive for the illustrated 8-ohm loud speaker "SPKR".

The output of the broadband RF amplifier Q1 also feeds through an $(f_v+6)$ MHz trap to the RF video amplifier and RF decode gate, shown schematically in block Q2, with the RF level of the input controlled by the video decoding timing pulses as explained in said Letters Patent. This decoded RF video signal is fed through switch SW2, ganged to SW1, to the TV receiver antenna connector (R) whenever SW2 is in the "STV" position. This provides a standard, full definition picture from the STV UHF transmission on channel 3 of the customer's TV receiver. As in the standard decoders of said Letters Patent, the pilot tone phase-controls the timing of the video RF decode pulses. The pilot tone from the FM detector U1 is applied to the pilot tone bandpass amplifier Q7 which feeds square waves to the horizontal window waveshaping circuit of a dual monostable multivibrator U2 which is triggered by the leading edge of the pilot square wave, as described in said Letters Patent. It provides front panel (F¹) adjustment, "Picture decode position adj.", of the decoding horizontal window start time and internal adjustment of pulse duration. The multivibrator U2 has two output terminals (½ U2) which drive the RF decode gate transistors Q2 to increase the RF gain by, for example, 8 dB during the horizontal sync period of the STV transmission. This restores the horizontal synchronizing pulse and color burst levels fully to correct the channel 3 STV RF video signal fed to the customer's set, as also explained in said Letters Patent.

Typical specification details for the circuit may be as follows:

| | |
|---|---|
| Input Channel | Ch. 3 |
| Output Channel | Ch. 3 |
| Input Level | −3dBmV to + 14dBmV |
| FM Aural and Pilot Channel | 17.917 MHz or 25.25MHz |
| Insertion Loss Ch. 2 to Ch. 13 | ≦ 2dB (STV/TV) switch in TV position |
| "STV/TV" switch isolation | ≧ 55dB |
| Front Panel Controls ("F") ("SW1-2") ("F¹") | (a) SPEAKER VOLUME ("VOL.") (b) "STV/TV" slide switch (c) "PICTURE DECODE POSITION ADJ." |
| Rear Panel Connectors | |
| 1. Input ("R") | 75ΩBTF |
| 2. Output ("VHF OUT") | 75ΩBTF |
| Decode Window Width | (11 ± 0.2) μs |
| Decode Window Width Stability | ±0.25 μs |
| Decode 8dB Calibration tol. | ±0.25 dB |
| "Picture Decode" position control range (½ U2) | ≧ ± μs by "Picture Decode Position Adj." |
| Decode Window Position stability | ≦ ± 2.5 μs long term drift. |
| Program Audio Frequeruncy Response (U3) | 50 Hz to 10kHz, ± 1.5dB at the output of program demodulator |
| Program Audio Total Harmonic Distortion | 2% max. at 1 Watt peak output. |
| Power output at clipping threshold | 2 Watt peak (typ.) |
| Volume Control reserve gain beyond clipping | ≧ 9dB |
| Program Audio to Noise, Hum and Buzz Ratio | ≧ 50dB |

While the invention has been described in connection with master antenna systems with cable distribution to TV sets, it will be clear that other common signal distribution centers may also employ the invention; and further modifications will also suggest themselves to those skilled in this art, such being considered to fall within the spirit and scope of the invention as defined in the appended claims.

I claim:

1. In a master antenna system and the like for receiving scrambled video signal sync subscription television signals and the like, having STV pilot tone and program audio signals, the combination of head end means for receiving UHF STV signals and provided with means for converting the same to a VHF channel while leaving the video signal sync in its scrambled state and extracting the STV pilot tone and program audio signals; FM modulator means at said head end means connected to modulate a separate carrier with the extracted signals; means for sending the scrambled STV signals and the FM modulated separate carrier from the head end means along cable means to a plurality of separate television receivers; and each television receiver being provided with simplified decoder means comprising pilot-tone controlled R F decoding gate means to restore the scrambled sync to produce an unscrambled video signal, and FM detector means for demodulating said pilot tone to enable such control of the gate means and demodulating said program audio signals.

2. A master antenna system and the like as claimed in claim 1 wherein the pilot-tone control of the R F decoding gate means is effected by window waveshaping means determining the decoding window start time and duration.

3. A master antenna system and the like as claimed in claim 2 and in which the scrambled sync comprises the horizontal sync, and the gate means, actuated by said window means, restores the horizontal sync pulse to unscramble the picture.

* * * * *